United States Patent
Kido et al.

(10) Patent No.: US 10,993,447 B2
(45) Date of Patent: May 4, 2021

(54) BONE-MEAT SEPARATION DEVICE FOR BONE-IN LIMB MEAT AND BONE-MEAT SEPARATION METHOD FOR BONE-IN LIMB MEAT

(71) Applicant: MAYEKAWA MFG. CO., LTD., Tokyo (JP)

(72) Inventors: Koji Kido, Tokyo (JP); Moemi Kato, Tokyo (JP); Akira Koizumi, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 63 days.

(21) Appl. No.: 16/603,697

(22) PCT Filed: Dec. 19, 2018

(86) PCT No.: PCT/JP2018/046707
§ 371 (c)(1),
(2) Date: Oct. 8, 2019

(87) PCT Pub. No.: WO2019/159526
PCT Pub. Date: Aug. 22, 2019

(65) Prior Publication Data
US 2021/0092970 A1 Apr. 1, 2021

(30) Foreign Application Priority Data

Feb. 14, 2018 (JP) .............................. JP2018-024036

(51) Int. Cl.
*A22C 21/00* (2006.01)
(52) U.S. Cl.
CPC ...... *A22C 21/0023* (2013.01); *A22C 21/0007* (2013.01); *A22C 21/0053* (2013.01)

(58) Field of Classification Search
CPC . A22C 21/00; A22C 21/0023; A22C 21/0038; A22C 21/0069; A22C 21/0076; A22C 21/0084

(Continued)

(56) References Cited

U.S. PATENT DOCUMENTS 5,173,077 A * 12/1992 van den Nieuwelaar ...................
A22B 5/0058
452/135
5,961,383 A * 10/1999 Janssen .............. A22C 21/0076
452/135

(Continued)

FOREIGN PATENT DOCUMENTS

EP 0366855 A1 5/1990
EP 1893029 A1 3/2008

(Continued)

OTHER PUBLICATIONS

Extended European Search Report issued in European Appln. No. 18906037.9 dated May 26, 2020.

(Continued)

*Primary Examiner* — Richard T Price, Jr.
(74) *Attorney, Agent, or Firm* — Rossi, Kimms & McDowell LLP (57) ABSTRACT

A bone-meat separation device for a bone-in limb meat according to an embodiment is a bone-meat separation device for a bone-in limb meat for separating a meat part adhering to a trunk-side end bone head of a bone-in limb meat, the device including a plurality of clamp portions for conveying the bone-in limb meat along a conveying path, a guide portion disposed on the conveying path and forming a V-shaped guide space with an open end thereof being directed upstream in a conveying direction of the bone-in limb meat, a cutter disposed at a downstream end of the guide space in the conveying direction, and a holding (Continued)

portion holding the meat part below the guide portion and the cutter. The holding portion is configured to hold the meat part of the bone-in limb meat when the meat part is cut from the trunk-side end bone head with the cutter.

14 Claims, 9 Drawing Sheets

(58) Field of Classification Search
USPC .................................................. 452/166–170
See application file for complete search history.

(56) References Cited

U.S. PATENT DOCUMENTS

| | | | |
|---|---|---|---|
| 7,195,554 B2 * | 3/2007 | Hayakawa | A22C 21/0023 |
| | | | 452/135 |
| 8,485,870 B2 | 7/2013 | Janssen | |
| 8,491,362 B2 * | 7/2013 | Kodama | A22C 17/004 |
| | | | 452/136 |
| 2006/0194532 A1 | 8/2006 | Hayakawa | |
| 2007/0082596 A1 | 4/2007 | Hayakawa | |
| 2009/0170417 A1 | 7/2009 | Janssen | |

FOREIGN PATENT DOCUMENTS

| | | |
|---|---|---|
| EP | 2022334 A1 | 2/2009 |
| EP | 1893029 B1 | 9/2009 |
| EP | 2277382 B1 | 3/2014 |
| JP | 4367952 B2 | 11/2009 |
| JP | 2013046636 A | 3/2013 |
| WO | 2004112489 A1 | 12/2004 |
| WO | 2007067052 A2 | 6/2007 |

OTHER PUBLICATIONS

International Search Report issued in Intl. Appln. No. PCT/JP2018/046707 dated Mar. 5, 2019. English translation provided.
Written Opinion issued in Intl. Appln. No. PCT/JP2018/046707 dated Mar. 5, 2019.
Office Action issued in European Appln. No. 18906037.9 dates Jan. 14, 2021.

* cited by examiner

BONE-MEAT SEPARATION DEVICE FOR BONE-IN LIMB MEAT AND BONE-MEAT SEPARATION METHOD FOR BONE-IN LIMB MEAT

TECHNICAL FIELD

The present disclosure relates to a bone-meat separation device and a bone-meat separation method for a bone-in limb meat.

BACKGROUND

In a recent food factory, automation of a dismantling process and a bone-meat separation step for poultry such as chickens is increased, releasing a worker from manual hard work. In a process of deboning a bone-in limb meat such as a bone-in thigh meat, automation is becoming possible in almost all steps.

Patent Document 1 discloses a device which automates a step of finally separating a meat part adhering to a femoral head from a bone part in a step of deboning a bone-in thigh meat. The automation device guides a bone-in thigh meat held by a clamper to a Y-shaped guide space formed by a Y-shaped derivation guide and cuts a meat part from a femoral head with a cutter disposed at a downstream end of the guide space.

CITATION LIST

Patent Literature

Patent Document 1: JP4367952B

SUMMARY

Technical Problem

A device disclosed in Patent Document 1 can cut a portion between a femoral head and a meat part with a cutter by guiding a bone-in thigh meat to the above-descried Y-shaped guide space and positioning the bone-in thigh meat while abutting the bone-in thigh meat on a Y-shaped derivation guide. However, a cutting position may shift due to oscillation of the femoral head at a free end or a positional shift of the femoral head running on the Y-shaped derivation guide. In this case, a meat part may remain in the femoral head, reducing the yield of the meat part.

In addition, oyster meat of commercial value adheres to the vicinity of a femoral head, and the oyster meat may remain in the femoral head without being separated from the femoral head.

In view of the above problems, an object of an embodiment is to improve the yield of a meat part separated from a bone part of a bone-in limb meat when the meat part is cut from a trunk-side end bone head in the final stage of a deboning step of separating the meat part from the bone part.

Solution to Problem (1) A bone-meat separation device for a bone-in limb meat according to an embodiment is a bone-meat separation device for a bone-in limb meat for separating a meat part adhering to a trunk-side end bone head of a bone-in limb meat, the device including a plurality of clamp portions for conveying the bone-in limb meat along a conveying path, a guide portion disposed on the conveying path and forming a V-shaped guide space with an open end thereof being directed upstream in a conveying direction of the bone-in limb meat, a cutter disposed at a downstream end of the guide space in the conveying direction, and a holding portion holding the meat part below the guide portion and the cutter. The holding portion is configured to hold the meat part of the bone-in limb meat when the meat part is cut from the trunk-side end bone head with the cutter.

"Bone-in limb meats" include front limbs and back limbs of a poultry carcass and a livestock carcass. In addition, a "trunk-side end bone head" refers to a bone head of a bone part on the side of a bone-in limb meat connected to a bone part on the side of a trunk in a trunk base part of the bone-in limb meat.

In the above configuration (1), when the bone-in limb meat conveyed by the clamp portion enters the above-described guide space, the bone-in limb meat is guided to the downstream end of the guide space while abutting on the guide portion and positioned at a cutting position with the cutter. An interval between the clamp portion and the cutter is adjusted in advance so as to allow the trunk-side end bone head of the bone-in limb meat entering the guide space to be positioned in the guide space and run on the upper surface of the guide portion at the downstream end of the guide space.

Since the above-described holding portion holds the meat part of the bone-in limb meat when the meat part of the bone-in limb meat is cut from the trunk-side end bone head with the cutter, it is possible to suppress oscillation of the bone-in limb meat and to stably position the bone-in limb meat at a predetermined cutting position. Thus, it is possible to accurately cut the portion between the meat part and the trunk-side end bone head, making it possible to improve the yield of the cut meat part and to simultaneously cut oyster meat as well from a bone part.

(2) In an embodiment, in the above configuration (1), the cutter is arranged adjacent to the guide portion below the guide portion.

With the above configuration (2), the cutter arranged adjacent to the guide portion below the guide portion can be positioned at a height between the trunk-side end bone head of a bone-in limb meat and the meat part adhering to the trunk-side end bone head when the trunk-side end bone head runs on the upper surface of the guide portion at the downstream end of the guide portion. Thus, it is possible to accurately cut a predetermined portion between the meat part and the trunk-side end bone head with the cutter and to improve the yield of the cut meat part.

(3) In an embodiment, in the above configuration (1) or (2), the guide portion includes a first guide member and a second guide member symmetrically arranged on the conveying path, and at least one of the first guide member or the second guide member is configured to be movable back and forth with respect to the conveying path.

With the above configuration (3), since at least one of the first guide member or the second guide member can be retracted from the conveying path after the bone-in limb meat is cut with the cutter, it is possible to suppress a clogging of a bone part held by the clamp portion or a meat part separated from the bone part at the downstream end of the guide space, or an interruption in conveyance of the bone part to a downstream side.

(4) In an embodiment, in the above configuration (3), the cutter is disposed integrally with a guide member of the first guide member or the second guide member configured to be movable back and forth with respect to the conveying path.

With the above configuration (4), since one of the guide members and the cutter can simultaneously be retracted after the meat part is cut, it is possible to effectively suppress a clogging of a bone part held by the clamp portion or a meat part separated from the bone part at the downstream end of the guide space, or an interruption in conveyance of the bone part to the downstream side.

(5) In an embodiment, in any one of the above configurations (1) to (4), the guide portion includes a guide rod arranged along a horizontal direction so as to define the guide space, and a guide plate disposed integrally with the guide rod along the horizontal direction and extending outside the guide space.

"Disposed or arranged along the horizontal direction" means that the guide rod and the guide plate are each disposed or arranged in the horizontal direction or at an inclination angle greater than or equal to 30° with respect to the horizontal direction.

With the above configuration (5), since the guide rod and the guide plate constituting the guide portion are arranged along the horizontal direction, the above-described V-shaped guide space is formed along the horizontal direction. Therefore, the bone-in limb meat held by the clamp portion and vertically suspended from the clamp portion can easily enter the guide space extending along the horizontal direction. In addition, since the guide rod and the guide plate are arranged along the horizontal direction, the trunk-side end bone head of the bone-in limb meat can easily run on the guide portion at the downstream end of the guide space. Therefore, it is possible to easily guide a cutting part of the bone-in limb meat at a cutting position.

(6) In an embodiment, in the above configuration (5), the cutter is arranged adjacent to the guide rod and the guide plate along the horizontal direction below the guide rod and the guide plate, and constituted by a plate-like blade having an arc-like blade edge.

With the above configuration (6), since the cutter is constituted by the plate-like blade having the arc-like blade edge and arranged along the horizontal direction, the degree of freedom of arrangement in the height direction is increased at a position adjacent to the guide rod and the guide plate arranged along the horizontal direction, making it possible to easily arrange the cutter at a desired cutting position.

(7) In an embodiment, in any one of the above configurations (1) to (6), the holding portion includes a pair of holding members configured to hold the meat part from both sides.

With the above configuration (7), since the holding portion includes the pair of holding members configured to hold the meat part from the both sides, it is possible to easily switch between a holding position where a bone-in limb meat is held and a holding release position by changing an interval between the pair of holding members.

(8) In an embodiment, in the above configuration (7), the bone-meat separation device for a bone-in limb meat further includes a first driving portion rotating the pair of holding members about a shaft at the same rotation angle along the conveying direction of the bone-in limb meat, and operating the pair of holding members at a holding position where the meat part is held and a holding release position respectively.

With the above configuration (8), the above-described first driving portion holds the meat part by operating the pair of holding members at the holding position when the meat part is cut with the cutter while simultaneously moving the pair of holding members in the same direction as the conveying direction of the bone-in limb meat. Thus, it is possible to suppress oscillation and a positional shift of the bone-in limb meat, and to stably position the bone-in limb meat, making it possible to improve the yield of the meat part separated and recovered from the bone part. It is also possible to operate the pair of holding members at the holding release position after the meat part is cut, and then return the pair of holding members to the holding position on the upstream side in the conveying direction of the bone-in limb meat, making it possible to deal with cutting of a plurality of bone-in limb meats with one holding portion.

Moreover, since the pair of holding members rotate about the shaft, the pair of holding members perform circular arc movement in a direction away from the clamp portion as they move from the upstream side of the cutting position to the cutting position. Therefore, it is possible to apply a pull force to the bone-in limb meat when the bone-in limb meat is cut with the cutter, making it possible to suppress oscillation of the bone-in limb meat and to stably position the bone-in limb meat at a predetermined cutting position. Therefore, it is possible to accurately cut the portion between the meat part and the trunk-side end bone head, and thus to improve the yield of the cut meat part.

(9) In an embodiment, in the above configuration (8), the first driving portion includes an arm rotatable about the shaft, a first air cylinder connected to one end side of the arm, a support frame mounted on the other end side of the arm, a pair of rotatable shafts rotatably mounted on the support frame and on which the pair of holding members are respectively mounted, a pair of gears respectively mounted on the pair of rotatable shafts and engaging with each other, and a second air cylinder rotating the pair of holding members about the pair of rotatable shafts at the holding position and the holding release position.

With the above-described configuration (9), the first air cylinder moves the support frame supporting the pair of holding members in the conveying direction, and the second air cylinder moves the pair of holding members to the holding position and the holding release position. Therefore, it is possible to synchronize timings of the movement in the conveying direction and an operation between the holding position and the holding release position (to be also referred to as an "opening/closing operation" hereinafter) of the pair of holding members by controlling the operations of the first air cylinder and the second air cylinder.

(10) In an embodiment, in the above configuration (7), the bone-meat separation device for a bone-in limb meat further includes a plurality of holding portions respectively corresponding to the plurality of clamp portions, and each of the plurality of holding portions is configured to move along the conveying path in synchronization with movement of a corresponding one of the clamp portions.

With the above configuration (10), since each of the plurality of holding portions hold the meat part when the meat part is cut with the cutter while moving with the corresponding one of the clamp portions, the pair of holding members of the holding portion need not perform the opening/closing operation. Therefore, it is possible to reduce a turnaround time for the final separation step and to enhance a processing capability. Furthermore, a driving portion with the above-described first air cylinder for causing the pair of holding members to perform rotational movement about the shaft along the conveying direction is no longer needed.

(11) In an embodiment, in the above configuration (10), the bone-meat separation device for a bone-in limb meat further includes a second driving portion moving each of the holding portions in a direction away from the corresponding one of the clamp portions when the meat part is cut with the cutter.

With the above configuration (11), since it is possible, with the second driving portion, to apply the pull force to the bone-in limb meat when the meat part is cut, it is possible to stably support the bone-in limb meat in the guide portion and position the bone-in limb meat at a predetermined position when the meat part is cut. Thus, it is possible to accurately cut the portion between the meat part and the trunk-side end bone head, and thus to further improve the yield of the recoverable meat part.

(12) In an embodiment, in any one of the above configurations (8) to (11), the bone-meat separation device for a bone-in limb meat further includes a chute disposed between the pair of holding members and receiving the meat part cut from the trunk-side end bone head.

With the above configuration (12), it is possible to drop the meat part cut with the cutter at a desired position (for example, on a discharge conveyor discharging a meat part) by sliding the meat part across the above-described chute.

(13) A bone-meat separation method for a bone-in limb meat according to an embodiment is a separation method for a bone-in limb meat for separating a meat part adhering to a trunk-side end bone head of a bone-in limb meat, the method including a conveyance step of holding the bone-in limb meat by a plurality of clamp portions and conveying the bone-in limb meat along a conveying path, a guide step of guiding the bone-in limb meat to a V-shaped guide space formed by a guide portion, the guide space having an open end directed to an upstream side in a conveying direction of the bone-in limb meat, a meat part cutting step of cutting the meat part from the trunk-side end bone head of the bone-in limb meat guided to the guide space with a cutter disposed at a downstream end of the guide space in the conveying direction, and a meat part holding step of holding the meat part by a holding portion to suppress oscillation of the meat part when the meat part is cut with the cutter.

With the above method (13), since the meat part of the bone-in limb meat is held by the above-described holding portion when cut with the above-described cutter, it is possible to suppress oscillation and a positional shift of the bone-in limb meat, and to position the bone-in limb meat at a predetermined position guided by the guide portion. Thus, it is possible to accurately cut the portion between the meat part and the trunk-side end bone head, making it possible to improve the yield of the recoverable meat part and to simultaneously cut oyster meat as well from a bone part.

(14) In an embodiment, in the above method (13), the meat part holding step further includes a pull force application step of applying a pull force to the meat part in a direction away from the trunk-side end bone head by the holding portion.

With the above method (14), since it is possible to apply the pull force to the bone-in limb meat when the meat part is cut, it is possible to position the bone-in limb meat at a predetermined position while stably supporting the bone-in limb meat in the guide portion when the meat part is cut. Thus, it is possible to accurately cut the portion between the meat part and the trunk-side end bone head, and thus to further improve the yield of the meat part to be recovered.

Advantageous Effects

According to an embodiment, it is possible to improve the yield of a meat part to be recovered when the meat part is cut from a trunk-side end bone head in the final stage of a deboning step of separating the meat part from a bone part of a bone-in limb meat.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain", and "constitute" are not intended to be exclusive of other components.

Figure 1A:
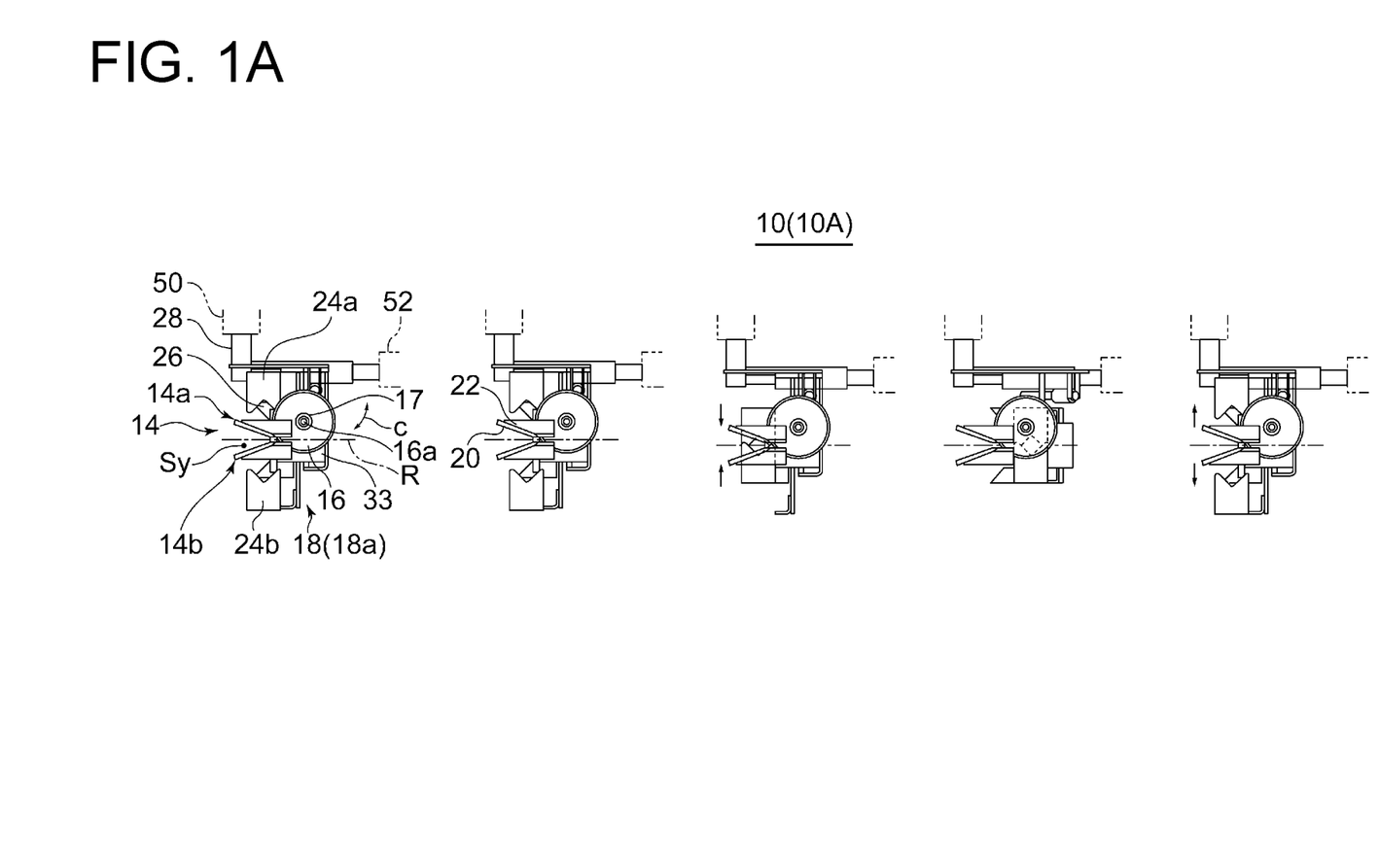
FIG. 1A is a planar view showing, in order of processing step, a bone-meat separation method by a bone-meat separation device according to an embodiment.
Figure 1B:
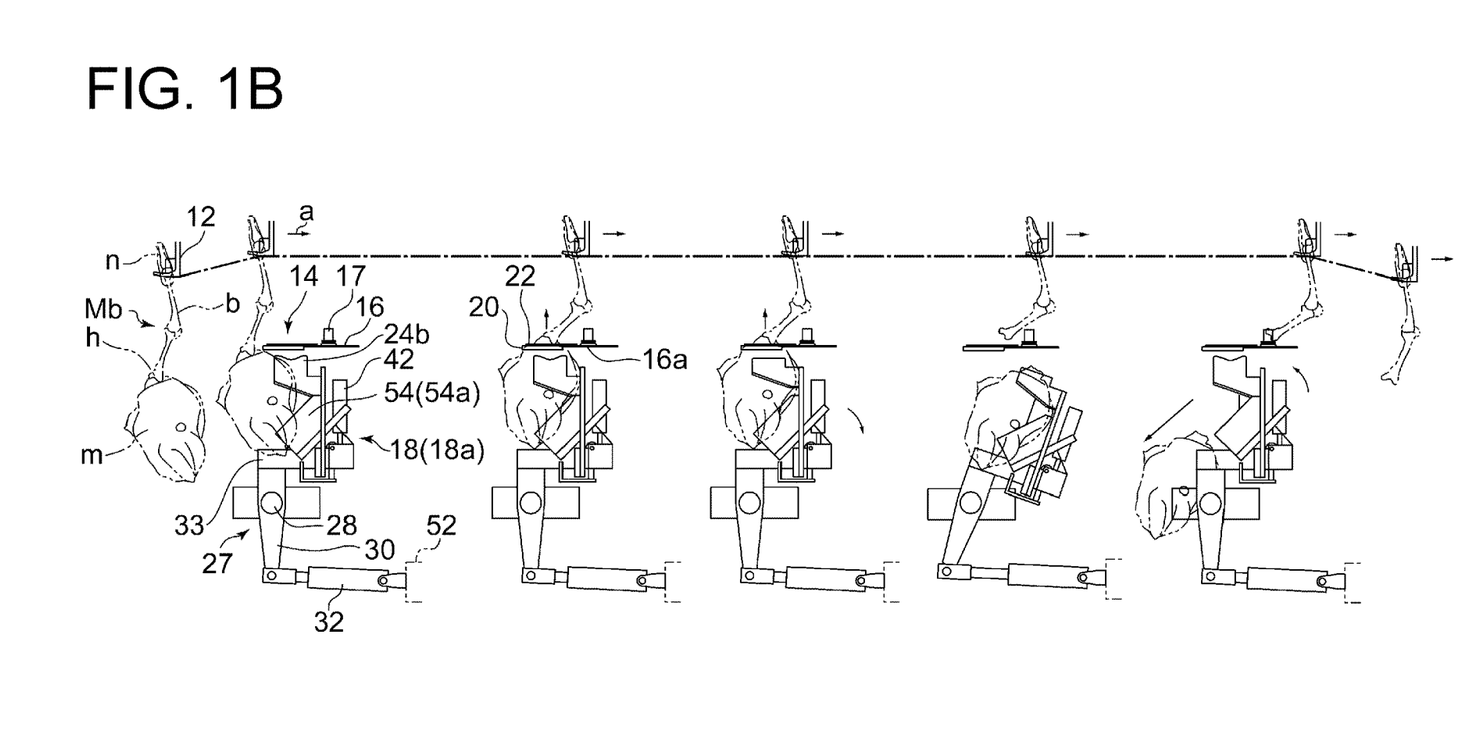
FIG. 1B is a front view showing, in order of processing step, the bone-meat separation method by the bone-meat separation device according to an embodiment.
Figure 2A:
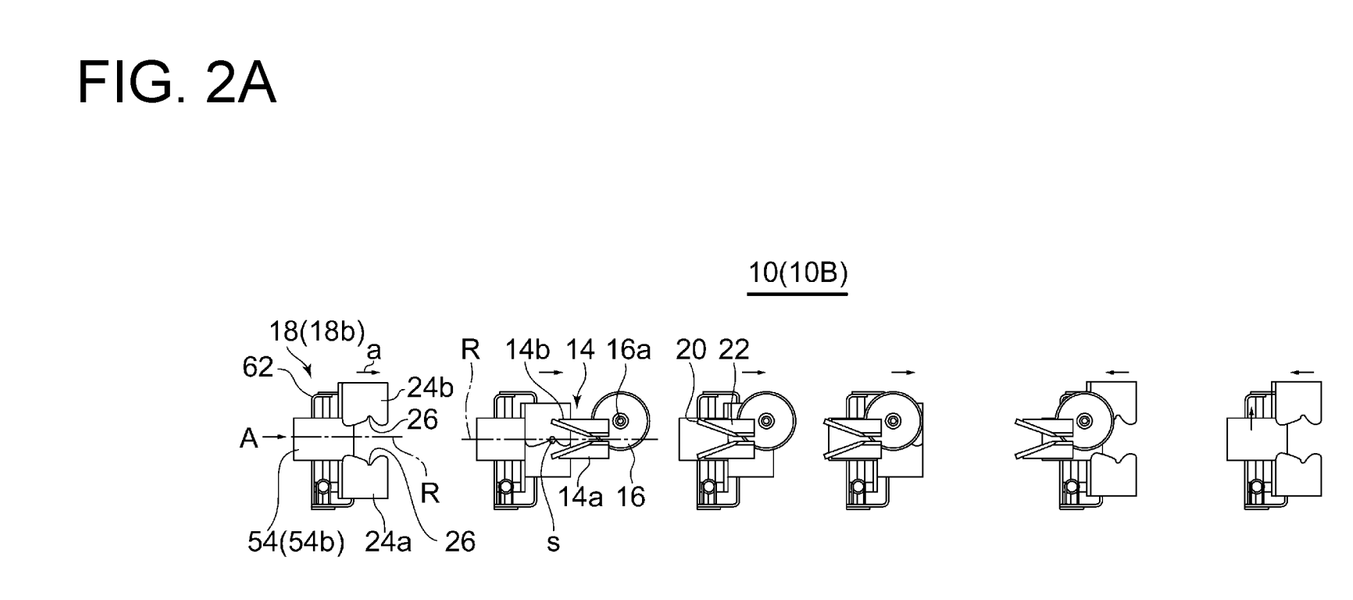
FIG. 2A is a planar view showing, in order of processing step, the bone-meat separation method by the bone-meat separation device according to an embodiment.
Figure 2B:
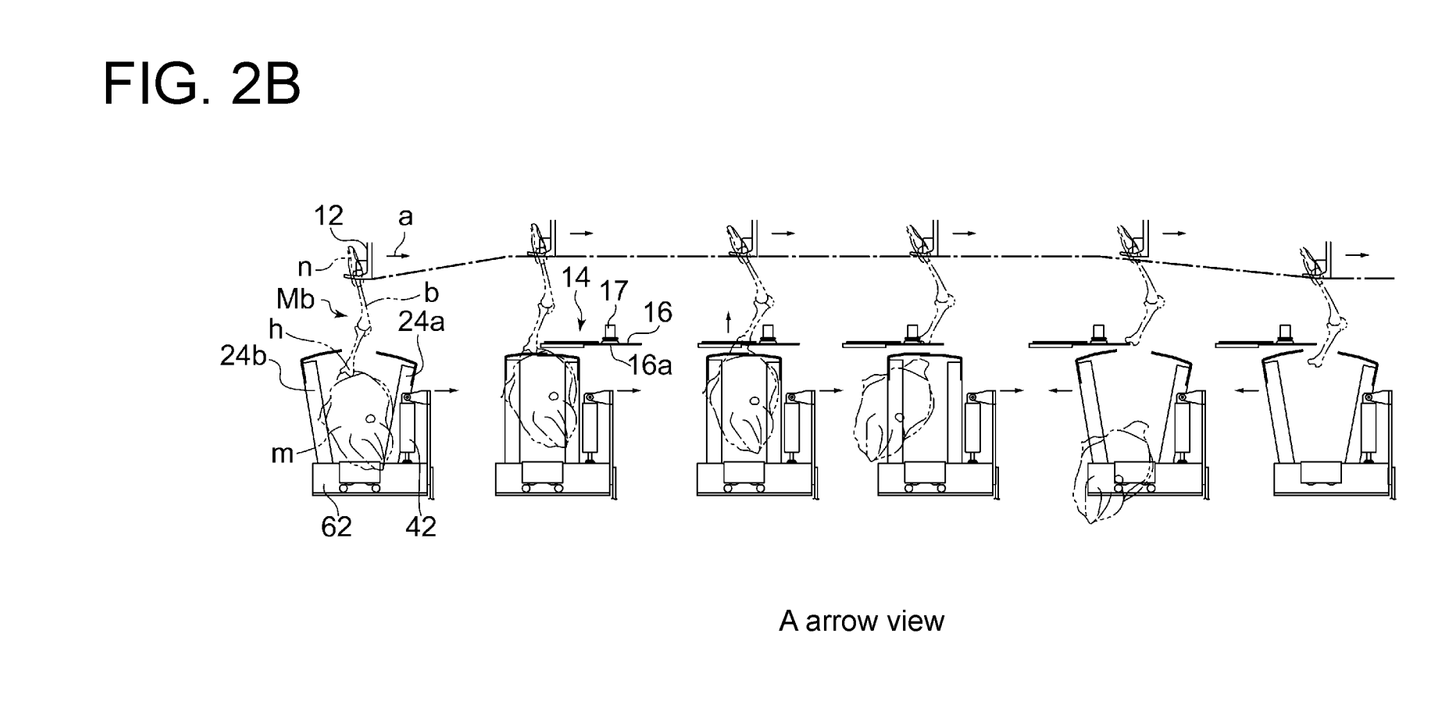
FIG. 2B is a front view showing, in order of processing step, the bone-meat separation method by the bone-meat separation device according to an embodiment.
Figure 3:
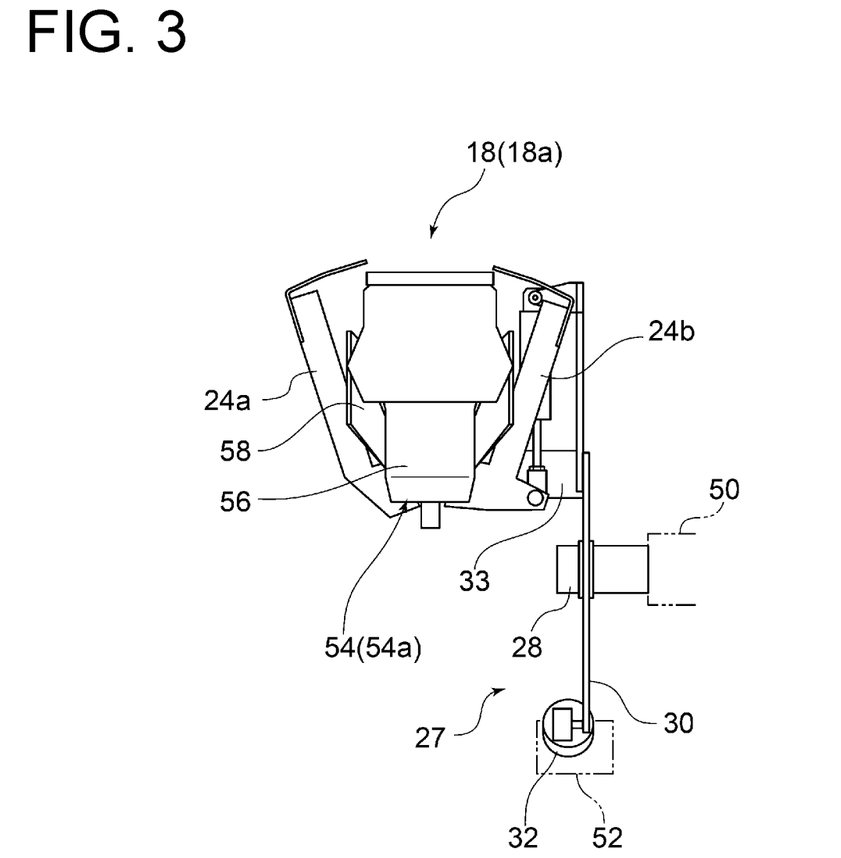
FIG. 3 is a side view of a holding portion according to an embodiment.
Figure 4:
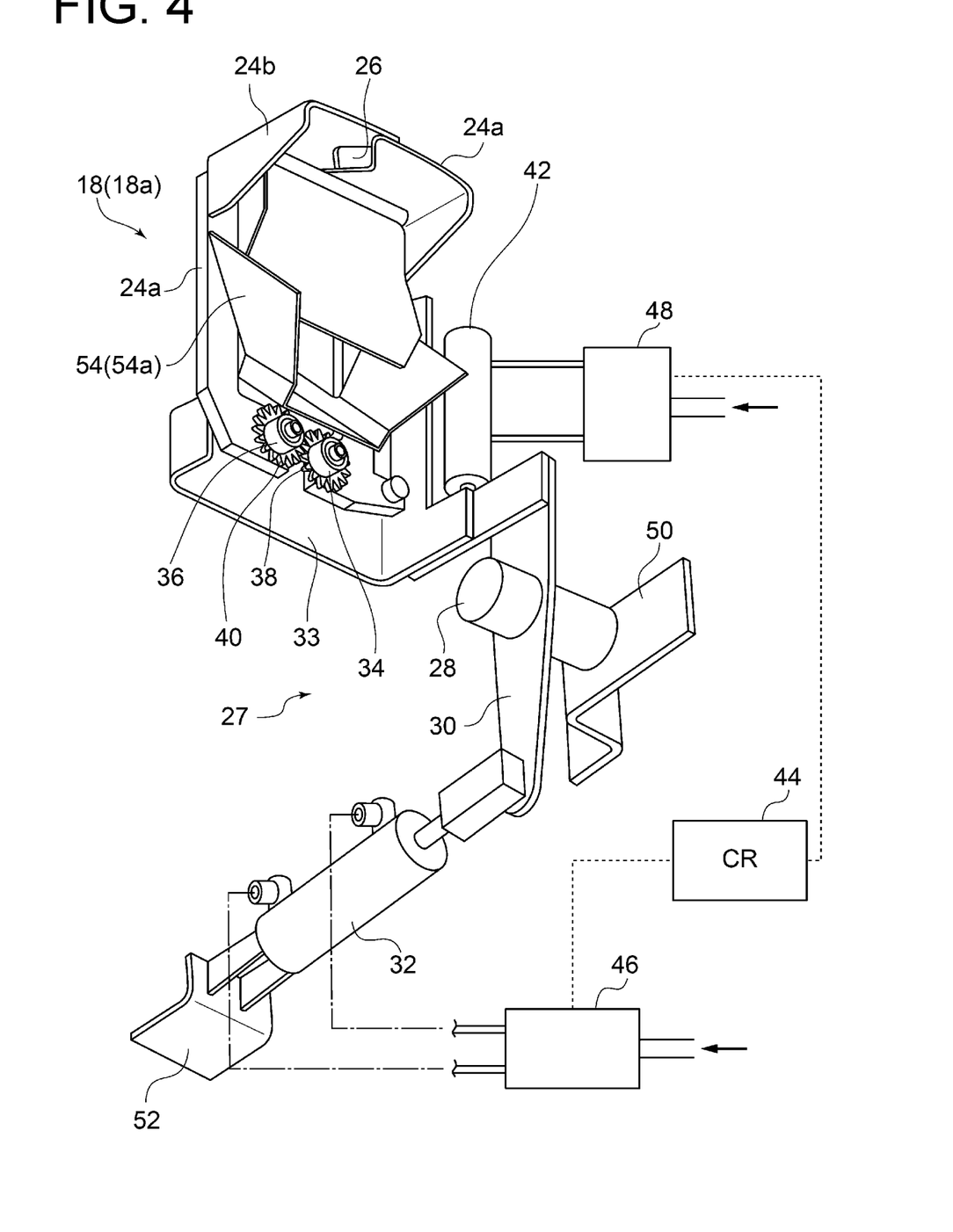
FIG. 4 is a perspective view of the holding portion according to an embodiment.
Figure 5:
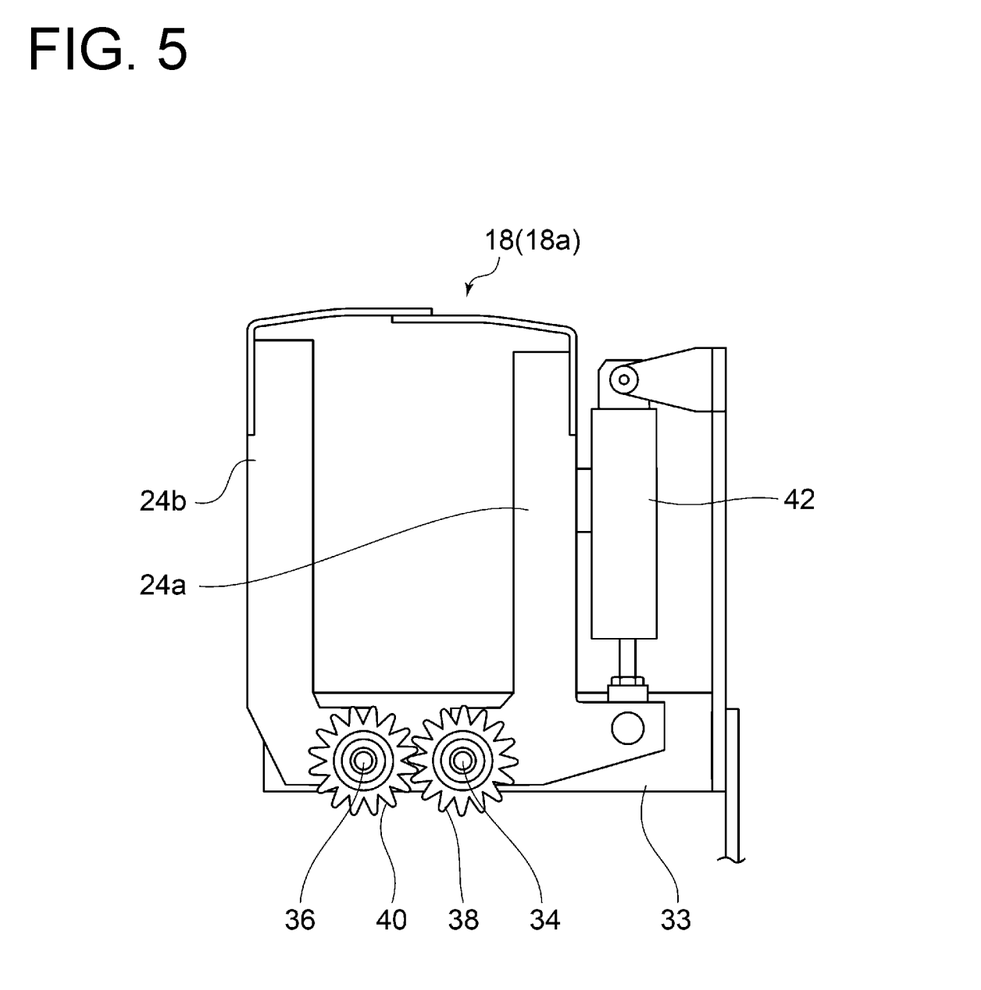
FIG. 5 is a side view of the holding portion according to an embodiment.
Figure 6:
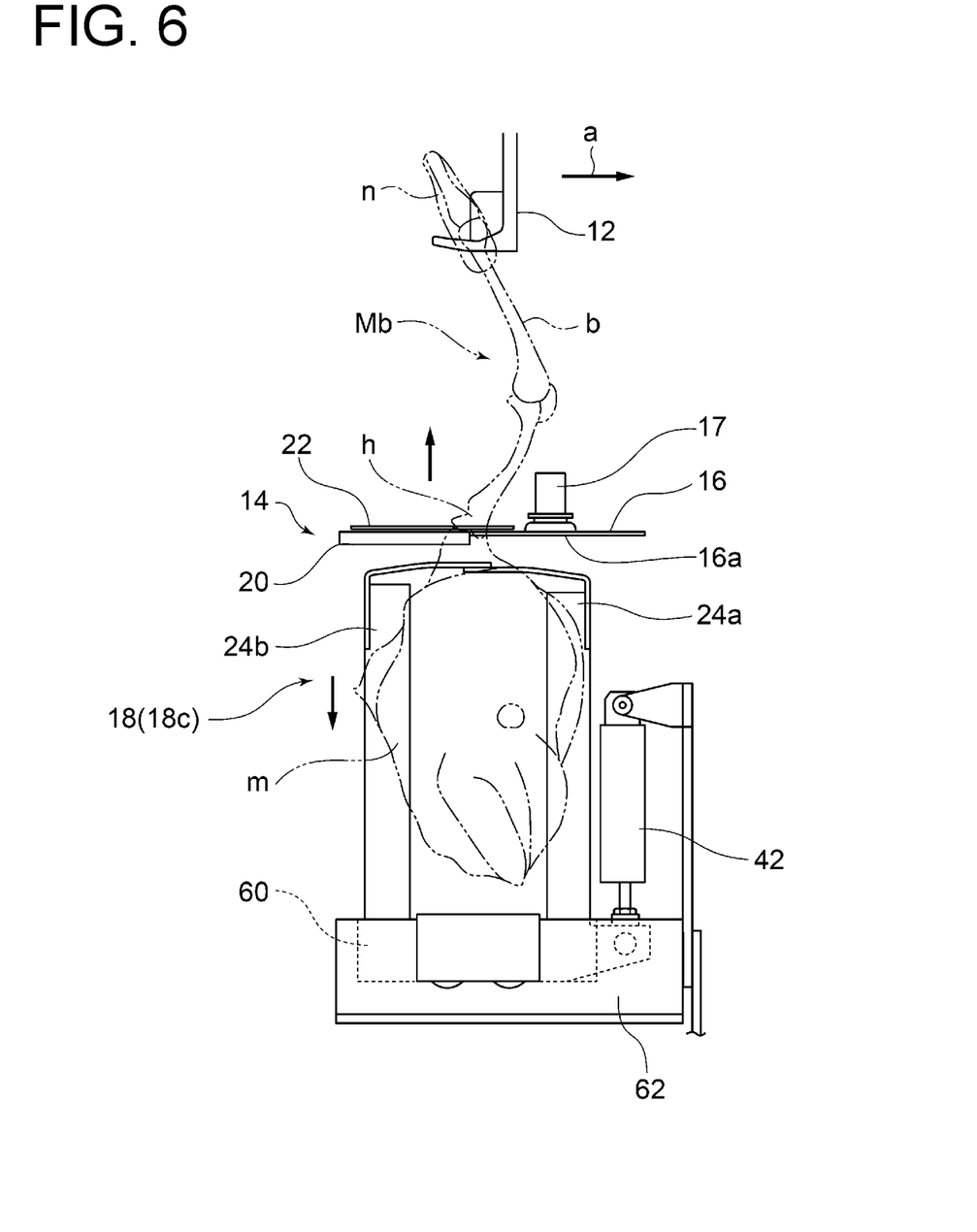
FIG. 6 is a front view of the bone-meat separation device according to an embodiment.

FIGS. 1 to 6 show a bone-meat separation device 10 (10A, 10B, 10C) for a bone-in limb meat according to some embodiments. FIGS. 1A and 1B show a final separation step of a bone-in limb meat Mb by the bone-meat separation device 10 (10A). FIGS. 2A and 2B show a final separation step by the bone-meat separation device 10 (10B). FIG. 2B is a view as seen in a direction of an arrow A in FIG. 2A. FIG. 3 is a side view of a holding portion 18 (18a) of the bone-meat separation device 10 (10A). FIGS. 4 and 5 show a driving portion of the bone-meat separation device 10 (10A). FIG. 6 shows the bone-meat separation device 10 (10C). The bone-in limb meat Mb is, for example, a bone-in thigh meat of poultry such as turkey.

In a deboning step of separating a meat part from a bone part of the bone-in limb meat Mb, a final separation step is a step of performing a deboning process in the deboning step at a prior stage, and finally and completely separating a meat part m adhering to a trunk-side end bone head h from a bone part b of the bone-in limb meat Mb. The trunk-side end bone head h is, for example, a femoral head connected to a trunk-side bone part in a bone-in thigh meat and is humeral head connected to a trunk-side bone part in a bone-in arm meat of beef, pork, mutton, or the like.

The bone-meat separation devices 10 (10A to 10C) include a plurality of clamp portions 12 each conveying the bone-in limb meat Mb along a predetermined conveying path R. For example, a conveyor such as a chain conveyor is disposed on the conveying path R, and the plurality of clamp portions 12 are mounted to the conveyor at regular intervals. For example, the conveyor moves at a constant speed and moves the clamp portions 12 at the constant speed on the conveying path R. The bone-in limb meat Mb held by the clamp portion 12 is conveyed in the direction of an arrow "a". The clamp portion 12 holds, for example, a limb neck part n and conveys the bone-in limb meat Mb while suspending the bone-in limb meat Mb in the vertical direction.

On the conveying path R, a guide portion 14 is disposed. The guide portion 14 forms a V-shaped guide space Sy with an open end thereof being directed upstream in a conveying direction. In addition, a cutter 16 is disposed at a downstream end of the guide space Sy in the conveying direction, and the holding portion 18 (18a, 18b, 18c) holding the meat part m of the bone-in limb meat Mb is disposed below the guide portion 14 and the cutter 16.

In the above-described configuration, the bone-in limb meat Mb moving through the conveying path R and entering the guide space Sy is guided while abutting on the guide portion 14 and reaches the downstream end of the guide space Sy. An interval between the clamp portion 12 and the guide portion 14 is adjusted such that a bone part in the vicinity of the trunk-side end bone head h is positioned in the guide space Sy. Therefore, the bone-in limb meat Mb entering the guide space Sy abuts on the inside of the guide portion 14 and is guided to the downstream end of the guide space Sy. The bone-in limb meat Mb runs on the upper surface of the guide portion 14 at the downstream end of the guide space Sy and is slightly inclined. Then, the trunk-side end bone head h reaches a predetermined cutting position. At this time, the meat part m adhering to the trunk-side end bone head h hangs down from the guide space Sy. The meat part m is cut from the trunk-side end bone head h by putting the cutter 16 to a portion between the meat part m and the trunk-side end bone head h of the bone-in limb meat Mb at the cutting position. The meat parts m are held by the holding portions 18 (18a to 18c) when cut with the cutters 16.

According to the above-described configuration, since the meat part m of the bone-in limb meat Mb is held by the holding portion 18 when cut with the cutter 16, it is possible to suppress oscillation of a bone-in limb meat at the downstream end of the guide space Sy and to stably position the bone-in limb meat at a predetermined position. Thus, it is possible to accurately cut the portion between the meat part m and the trunk-side end bone head h with the cutter 16, making it possible to improve the yield of the meat part m and to simultaneously cut oyster meat as well from a bone part.

In an embodiment, as shown in each of FIGS. Iowa to 2B, the cutter 16 is arranged adjacent to the guide portion 14 below the guide portion 14.

According to the present embodiment, the cutter 16 arranged adjacent to the guide portion below the guide portion can be positioned at a height between the trunk-side end bone head h of the bone-in limb meat Mb and the meat part m adhering to the trunk-side end bone head h when the trunk-side end bone head h runs on the upper surface of the guide portion 14 at the downstream end of the guide space Sy. Thus, it is possible to accurately cut the portion between the meat part m and the trunk-side end bone head h with the cutter 16, and to improve the yield of the cut meat part m.

In an embodiment, the guide portion 14 includes a first guide member 14a and a second guide member 14b symmetrically arranged on the conveying path R, and at least one of the first guide member 14a or the second guide member 14b is configured to be movable back and forth with respect to the conveying path R.

According to the present embodiment, it is possible to suppress a clogging of a bone part held by the clamp portion 12 or the meat part m separated from the bone part at the downstream end of the Y-shaped guide space Sy, or an interruption in conveyance of the bone part to a downstream side by retracting at least one of the first guide member 14a or the second guide member 14b from the conveying path R after the bone-in limb meat Mb is cut with the cutter 16.

In an embodiment, the cutter 16 is disposed integrally with one of the first guide member 14a or the second guide member 14b configured to be movable back and forth with respect to the conveying path R.

According to the present embodiment, it is possible to suppress a clogging of a bone part held by the clamp portion 12 or the meat part m separated from the bone part at the downstream end of the Y-shaped guide space Sy, or an interruption in conveyance of the bone part to the downstream side by simultaneously retracting one of the guide member 14a or 14b and the cutter 16 from the conveying path R after the meat part m is cut.

In the bone-meat separation device 10 (10A) shown in FIGS. 1A and 1B, the cutter 16 is disposed integrally with the first guide member 14a, and the cutter 16 and the first guide member 14a are configured to be movable in the direction to retract from the conveying path R (direction of an arrow c).

Thus, it is possible to ensure a wide space on the conveying path R and to suppress, for example, a clogging of a bone part held by the clamp portion 12 or the meat part m separated from the bone part.

In an embodiment, the guide portion 14 includes a guide rod 20 and a guide plate 22. The guide rod 20 is arranged along the horizontal direction so as to define the guide space Sy. The guide rod 20 and the guide plate 22 are formed integrally. The guide plate 22 extends outside the guide space Sy.

According to the present embodiment, since the guide portion 14 includes the guide rod 20 and the guide plate 22, it is possible to reduce the size of the guide portion 14, and to allow the bone-in limb meat Mb vertically suspended from the clamp portion 12 to easily enter the guide space Sy extending along the horizontal direction. In addition, since the guide rod 20 and the guide plate 22 are arranged within a horizontal plane, the cutter 16 arranged adjacent to the guide portion 14 is easily arranged, making it possible to select a desired cutting position for the bone-in limb meat Mb suspended from the clamp portion 12.

The guide rod 20 and the guide plate 22 are each arranged at an inclination angle greater than or equal to 30° with respect to the horizontal direction. For example, the guide rod 20 and the guide plate 22 are arranged to be inclined downward toward the upstream side in the conveying direction of the bone-in limb meat Mb, allowing the trunk-side end bone head h to easily run on the upper surface of the guide plate 22 at the downstream end of the guide space Sy. Thus, it is possible to easily position a cutting part of the bone-in limb meat Mb at a cutting position with the cutter 16.

In an embodiment, the cutter 16 is constituted by a plate-like blade having an arc-like blade edge. The cutter 16 is arranged adjacent to the guide rod 20 and the guide plate 22 along the horizontal direction below the guide rod 20 and the guide plate 22.

According to the present embodiment, since the cutter 16 is constituted by the plate-like blade arranged along the horizontal direction, the cutter 16 is arranged with a higher degree of freedom when arranged adjacent to the guide rod 20 and the guide plate 22 arranged along the horizontal direction, making it possible to arrange the cutter 16 at a desired cutting position.

In an embodiment, as shown in FIGS. 1A to 2B, the cutter 16 is constituted by a plate-like blade whose outer shape is a circle, and its blade edge is formed on the circumference of the circle. The round blade cuter is configured to be rotatable about a center shaft 16a and cuts the bone-in limb meat Mb with the blade edge formed on the circumference of the rotating plate-like blade. To the center shaft 16a, a power transmitting portion 17 is connected, transmitting a driving force rotating the round blade cuter via the power transmitting portion 17 from a driving portion (not shown).

Using the thus configured round blade cutter, the cutter 16 is arranged with a higher degree of freedom, making it possible to arrange the cutter 16 at the desired cutting position.

In an embodiment, the holding portion 18 includes a pair of holding members 24a and 24b configured to hold a meat part from both sides.

According to the present embodiment, since the holding portion 18 is configured to hold the meat part m from the both sides with the pair of holding members 24a and 24b, it is possible to easily switch whether or not to hold the meat part m by changing an interval between the pair of holding members.

In an embodiment, the pair of holding members 24a and 24b are constituted by L-shaped arms, and are configured to hold the bone-in limb meat Mb from the both sides with tip parts facing each other.

In an embodiment, in the tip parts facing each other, recesses 26 housing the bone-in limb meat Mb are formed. Since the bone-in limb meat Mb is housed in the recesses 26 when held, it is possible to increase a force holding the bone-in limb meat Mb with the pair of holding members 24a and 24b.

As shown in FIG. 3, the bone-meat separation device 10 (10A) includes a first driving portion 27. In the holding portion 18 (18a), the first driving portion 27 allows the pair of holding members 24a and 24b to rotate about a shaft at the same rotation angle along the conveying direction (the direction of the arrow "a") of the bone-in limb meat Mb, and operates the pair of holding members 24a and 24b at a holding position where the meat part m is held and a holding release position respectively.

While simultaneously moving the pair of holding members 24a and 24b in the same direction as the conveying direction of the bone-in limb meat Mb, the pair of holding members 24a and 24b are operated at the holding position to hold the meat part m when the meat part m is cut with the cutter 16. Thus, it is possible to suppress oscillation and a positional shift of the bone-in limb meat Mb, and to stably position the bone-in limb meat Mb at a predetermined cutting position, making it possible to improve the yield of the meat part separated and recovered from the bone part b. It is also possible to operate the pair of holding members 24a and 24b at the holding release position after the meat part m is cut, and then return the pair of holding members 24a and 24b to the holding position on the upstream side in the conveying direction of the bone-in limb meat Mb, making it possible to deal with cutting of a plurality of bone-in limb meats Mb with one holding portion 18 (18a).

In the bone-meat separation device 10 (10A), the pair of holding members 24a and 24b originally disposed at the holding release position are operated at the holding position immediately before a cutting step with the cutter 16, and are operated at the holding release position after the cutting step.

Moreover, since the pair of holding members 24a and 24b rotate about the shaft, the pair of holding members 24a and 24b perform circular arc movement in a direction away from the clamp portion 12 as they move from the upstream side of the cutting position to the cutting position. Therefore, it is possible to apply a pull force to the bone-in limb meat Mb when the bone-in limb meat Mb is cut with the cutter 16, making it possible to suppress oscillation of the bone-in limb meat Mb and to stably position the bone-in limb meat Mb at a predetermined cutting position. Therefore, it is possible to accurately cut the portion between the meat part m and the trunk-side end bone head h, and thus to improve the yield of the meat part m separated from the bone part.

In the bone-meat separation device 10 (10A) according to an embodiment, as shown in FIGS. 4 and 5, the first driving portion 27 includes an arm 30 rotatably disposed on a shaft 28. The arm 30 includes a first air cylinder 32 connected to one end side thereof and a support frame 33 mounted on the multi-end side thereof. On the support frame 33, a pair of rotatable shafts 34 and 36 are rotatably mounted. On the rotatable shafts 34 and 36, gears 38 and 40 are respectively mounted, and engage with each other. The pair of holding members 24a and 24b are respectively configured to be rotatable about the rotatable shafts 34 and 36 at the holding position and the holding release position by a second air cylinder 42.

In the above-described configuration, the first air cylinder 32 moves the support frame 33 supporting the pair of holding members 24a and 24b in the conveying direction (the direction of the arrow "a"), and the second air cylinder 42 moves the pair of holding members 24a and 24b to the holding position and the holding release position. Therefore, it is possible to synchronize timings of the movement in the conveying direction and an opening/closing operation of the pair of holding members 24a and 24b by controlling the operations of the first air cylinder 32 and the second air cylinder 42.

In an embodiment, as shown in FIG. 4, a control portion 44 is provided to control the operations of the first air cylinder 32 and the second air cylinder 42. Since the control portion 44 controls the operations of the first air cylinder 32 and the second air cylinder 42, it is possible to synchronize the timings of the movement in the conveying direction and the opening/closing operation of the pair of holding members 24a and 24b.

For example, an operation of holding the meat part m at a rotation starting point on the upstream side in the conveying direction, rotating downstream in the conveying direction in synchronization with the movement of the bone-in limb meat Mb while holding the meat part m, after the meat part m is cut with the cutter 16, changing the pair of holding members 24a and 24b to the holding release position at a rotation ending point, and returning the pair of holding members 24a and 24b to the rotation starting point is repeated.

In an embodiment, the control portion 44 controls operations of an air suction/discharge device 46 and an air suction/discharge device 48, thereby controlling the operations of the first air cylinder 32 and the second air cylinder 42. The air suction/discharge device 46 sucks/discharges pressurized air in the first air cylinder 32, and the air suction/discharge device 48 sucks/discharges pressurized air in the second air cylinder 42.

In an embodiment, the shaft 28 is supported by a base portion 50, and the first air cylinder 32 is supported by a base portion 52.

The bone-meat separation device 10 (10B) shown in FIGS. 2A and 2B includes the plurality of holding portions 18 (18b) respectively corresponding to the plurality of clamp portions 12. Each of the plurality of holding portions 18 (18b) is arranged below a corresponding one of the clamp portions 12 and configured to move along the conveying path R in synchronization with movement of the corresponding clamp portion 12. Similarly to the holding portion 18 (18a), the plurality of holding portions 18 (18b) each include a driving portion with the second air cylinder 42 for performing the opening/closing operation of the pair of holding members 24a and 24b.

According to the present embodiment, since the plurality of holding portions 18 (18b) each hold the meat part m when the meat part m is cut with the cutter 16 while moving with the corresponding clamp portion 12, the pair of holding members 24a and 24b of the holding portion need not perform the opening/closing operation. Therefore, it is possible to reduce a turnaround time for the final separation step and to enhance a processing capability. Furthermore, a driving portion with the first air cylinder 32 for causing the pair of holding members 24a and 24b to perform rotational movement about the shaft along the conveying direction is no longer needed.

In the bone-meat separation device 10 (10B), the pair of holding members 24a and 24b originally disposed at the holding release position are operated at the holding position immediately before reaching the guide portion 14. Subsequently, after the cutting step with the cutter 16, the pair of holding members 24a and 24b operate at the holding release position.

In an embodiment, as shown in FIGS. 2A and 2B, when the pair of holding members 24a and 24b are positioned at the above-described holding position, the recesses 26 formed in the holding members 24a and 24b form a holding space s through which the trunk-side end bone head h cannot pass. In the present embodiment, the pair of holding members 24a and 24b hold only the meat part m below the trunk-side end bone head h.

In another embodiment, the pair of holding members 24a and 24b hold a bone part (for example, a femur, a humerus, or the like) having the trunk-side end bone head h above the trunk-side end bone head h. In the present embodiment, an interval between the pair of holding members 24a and 24b is controlled such that the holding space s formed by the recesses 26 of the pair of holding members 24a and 24b has a size capable of passing the trunk-side end bone head h. Then, the clamp portion 12 lifts the bone-in limb meat Mb while conveying the bone-in limb meat Mb. Consequently, the trunk-side end bone head h passes through the holding space s, the meat part m positioned below the trunk-side end bone head h is held in the holding space s, and the meat part m is cut from the trunk-side end bone head h.

In an embodiment, the bone-meat separation device 10 (10C) shown in FIG. 6 includes the holding portion 18 (18c). The holding portion 18 (18c) basically has the same configuration as the holding portion 18 (18b). That is, the bone-meat separation device 10 (10C) includes the plurality of holding portions respectively corresponding to the plurality of clamp portions 12, and each of the plurality of holding portions is arranged below the corresponding one of the clamp portions 12 and configured to move along the conveying path R in synchronization with the movement of the corresponding clamp portion 12.

The holding portion 18 (18c) of the plurality of holding portions further includes, in addition to the configuration of the holding portion 18 (18b), a second driving portion 60 moving the pair of holding members 24a and 24b in the direction away from the clamp portion 12 when the meat part m is cut with the cutter 16.

According to the present embodiment, since it is possible, with the second driving portion 60, to apply the pull force to the bone-in limb meat Mb when the meat part m is cut, it is possible to stably support and position the bone-in limb meat Mb in the guide portion 14 when the meat part m is cut. Thus, it is possible to accurately cut the portion between the meat part m and the trunk-side end bone head h, and thus to further improve the yield of the recoverable meat part m.

In an embodiment, the holding portions 18 (18a to 18c) shown in FIGS. 1A to 6 are each configured such that the pair of holding members 24a and 24b perform the opening/closing operation in the direction orthogonal to the conveying direction (the direction of the arrow "a") of the bone-in limb meat Mb. For the sake of descriptive simplicity, FIG. 2B is a view as seen in the direction of the arrow A in FIG. 2A.

In an embodiment, the holding portion 18 (18b) shown in FIG. 2A and the holding portion 18 (18c) shown in FIG. 6 are each configured such that lower parts of the pair of holding members 24a and 24b are housed in a case 62, and the case 62 moves in the conveying direction at the same speed as the clamp portion 12.

In an embodiment, as shown in FIG. 4, the bone-meat separation devices 10 (10A to 10C) each include a chute 54 (54a, 54b) disposed between the pair of holding members 24a and 24b. The meat part m cut from the trunk-side end bone head h is received by the chute 54 and slides across the chute 54, making it possible to drop the meat part m at a desired position (for example, on a discharge conveyor discharging a meat part).

In the bone-meat separation device 10 (10A) shown in FIG. 3, the chute 54 (54a) has an inclined bottom surface 56 and side plates 58 on both sides of the bottom surface 56. The side plates 58 can prevent the meat part m sliding down the bottom surface 56 from dropping off the both sides.

A bone-meat separation method for the bone-in limb meat Mb according to an embodiment is a method according to the final separation step of performing a deboning process in the deboning step of separating the meat part m from the bone part b of the bone-in limb meat Mb at the prior stage, and completely separating the meat part m adhering to the trunk-side end bone head h of the bone-in limb meat Mb.

Figure 7:
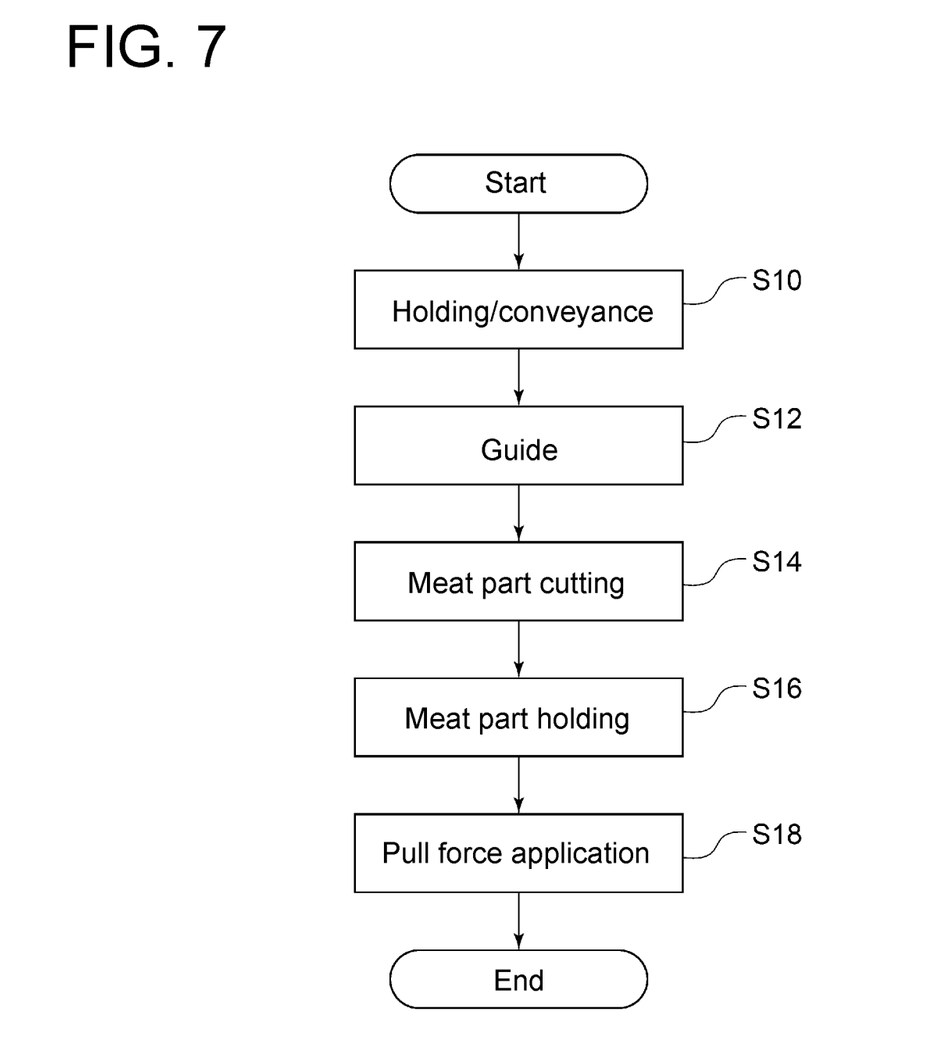
FIG. 7 is a flowchart of the bone-meat separation method according to an embodiment.

As shown in FIG. 7, first, the bone-in limb meats Mb are held by the plurality of clamp portions 12 and conveyed along the conveying path R (conveyance step S10). Then, the bone-in limb meats Mb are each guided to the Y-shaped guide space Sy formed by the guide portion 14 (guide step S12). The bone-in limb meat Mb guided to the guide space Sy gets the meat part m cut from the trunk-side end bone head h with the cutter 16 disposed at the downstream end of the guide space Sy in the conveying direction (meat part cutting step S14). When the meat part m is cut with the cutter 16, the holding portion 18 holds the meat part m to suppress oscillation of the meat part m (meat part holding step S16).

According to the above-described method, since the meat part m of the bone-in limb meat Mb is held by the holding portion 18 when cut with the cutter 16, it is possible to suppress oscillation and a positional shift of the bone-in limb meat Mb, and to position the bone-in limb meat Mb at a predetermined position guided by the guide portion 14. Thus, it is possible to accurately cut the portion between the meat part m and the trunk-side end bone head h with the cutter 16, making it possible to improve the yield of the recoverable meat part m and to simultaneously cut oyster meat as well from a bone part.

In an embodiment, in the meat part holding step S16, the holding portion 18 applies the pull force to the meat part m in the direction away from the trunk-side end bone head h (pull force application step S18).

According to the present embodiment, since it is possible to apply the pull force to the bone-in limb meat Mb when the meat part m is cut, it is possible to position the bone-in limb meat Mb at a predetermined position while stably supporting the bone-in limb meat Mb in the guide portion 14 when the meat part m is cut. Thus, it is possible to accurately cut the portion between the meat part m and the trunk-side end bone head h, and thus to further improve the yield of the meat part m.

The pull force application step S18 can be performed by the bone-meat separation device 10 (10A, 10C).

INDUSTRIAL APPLICABILITY

According to an embodiment, it is possible to improve the yield of a meat part to be recovered in a final separation step of completely separating a meat part adhering to a trunk-side end bone head of a bone-in limb meat from the trunk-side end bone head. The above-described some embodiments are also applicable to a deboning step of a bone-in limb meat of livestock such as beef, pork, and mutton, other than a bone-in thigh meat of poultry.

REFERENCE SIGNS LIST 10 (10A, 10B, 10C) Bone-meat separation device
12 Clamp portion
14 Guide portion
16 Cutter
18 (18a, 18b, 18c) Holding portion
20 Guide rod
22 Guide plate
24a, 24b Holding member
26 Recess
27 First driving portion
28 Shaft
30 Arm
32 First air cylinder
33 Support frame
34, 36 Rotatable shaft
38, 40 Gear
42 Second air cylinder
44 Control portion
46, 48 Air suction/discharge device
50, 52 Base portion
54 (54a, 54b) Chute
  56 Bottom surface
  58 Side plate
60 First driving portion
62 Case
Mb Bone-in limb meat
R Conveying path
b Bone part
h Trunk-side end bone head
m meat part
n Limb neck part
s Holding space

The invention claimed is:

1. A bone-meat separation device for a bone-in limb meat for separating a meat part adhering to a trunk-side end bone head of a bone-in limb meat, the device comprising:
   a plurality of clamp portions for conveying the bone-in limb meat along a conveying path;
   a guide portion disposed on the conveying path and forming a V-shaped guide space with an open end thereof being directed upstream in a conveying direction of the bone-in limb meat;
   a cutter disposed at a downstream end of the guide space in the conveying direction; and
   a holding portion holding the meat part below the guide portion and the cutter,
   wherein the holding portion is configured to hold the meat part of the bone-in limb meat when the meat part is cut from the trunk-side end bone head with the cutter.

2. The bone-meat separation device for a bone-in limb meat according to claim 1,
   wherein the cutter is arranged adjacent to the guide portion below the guide portion.

3. The bone-meat separation device for a bone-in limb meat according to claim 1,
   wherein the guide portion includes a first guide member and a second guide member symmetrically arranged on the conveying path, and
   wherein at least one of the first guide member or the second guide member is configured to be movable back and forth with respect to the conveying path.

4. The bone-meat separation device for a bone-in limb meat according to claim 3,
   wherein the cutter is disposed integrally with a guide member of the first guide member or the second guide member configured to be movable back and forth with respect to the conveying path.

5. The bone-meat separation device for a bone-in limb meat according to claim 1,
   wherein the guide portion includes:
   a guide rod arranged along a horizontal direction so as to define the guide space; and
   a guide plate disposed integrally with the guide rod along the horizontal direction and extending outside the guide space.

6. The bone-meat separation device for a bone-in limb meat according to claim 5,
   wherein the cutter is arranged adjacent to the guide rod and the guide plate along the horizontal direction below the guide rod and the guide plate, and constituted by a plate-like blade having an arc-like blade edge.

7. The bone-meat separation device for a bone-in limb meat according to claim 1,
wherein the holding portion includes a pair of holding members configured to hold the meat part from both sides.

8. The bone-meat separation device for a bone-in limb meat according to claim 7, further comprising a first driving portion rotating the pair of holding members about a shaft at the same rotation angle along the conveying direction of the bone-in limb meat, and operating the pair of holding members at a holding position where the meat part is held and a holding release position respectively.

9. The bone-meat separation device for a bone-in limb meat according to claim 8,
wherein the first driving portion includes:
an arm rotatable about the shaft;
a first air cylinder connected to one end side of the arm;
a support frame mounted on the other end side of the arm;
a pair of rotatable shafts rotatably mounted on the support frame and on which the pair of holding members are respectively mounted;
a pair of gears respectively mounted on the pair of rotatable shafts and engaging with each other; and
a second air cylinder rotating the pair of holding members about the pair of rotatable shafts at the holding position and the holding release position.

10. The bone-meat separation device for a bone-in limb meat according to claim 8, further comprising a chute disposed between the pair of holding members and receiving the meat part cut from the trunk-side end bone head.

11. The bone-meat separation device for a bone-in limb meat according to claim 7, further comprising a plurality of holding portions respectively corresponding to the plurality of clamp portions,
wherein each of the plurality of holding portions is configured to move along the conveying path in synchronization with movement of a corresponding one of the clamp portions.

12. The bone-meat separation device for a bone-in limb meat according to claim 11, further comprising a second driving portion moving each of the holding portions in a direction away from the corresponding one of the clamp portions when the meat part is cut with the cutter.

13. A bone-meat separation method for a bone-in limb meat for separating a meat part adhering to a trunk-side end bone head of a bone-in limb meat, the method comprising:
a conveyance step of holding the bone-in limb meat by a plurality of clamp portions and conveying the bone-in limb meat along a conveying path;
a guide step of guiding the bone-in limb meat to a V-shaped guide space formed by a guide portion, the guide space having an open end directed to an upstream side in a conveying direction of the bone-in limb meat;
a meat part cutting step of cutting the meat part from the trunk-side end bone head of the bone-in limb meat guided to the guide space with a cutter disposed at a downstream end of the guide space in the conveying direction; and
a meat part holding step of holding the meat part by a holding portion to suppress oscillation of the meat part when the meat part is cut with the cutter.

14. The bone-meat separation method for a bone-in limb meat according to claim 13,
wherein the meat part holding step further includes a pull force application step of applying a pull force to the meat part in a direction away from the trunk-side end bone head by the holding portion.

\* \* \* \* \*